US011821153B2

(12) United States Patent
Doy et al.

(10) Patent No.: US 11,821,153 B2
(45) Date of Patent: Nov. 21, 2023

(54) MILLING MACHINE WITH HEAT EXCHANGER CIRCUIT

(71) Applicant: Caterpillar Paving Products Inc., Brooklyn Park, MN (US)

(72) Inventors: Nathaniel S. Doy, Maple Grove, MN (US); Derek P. Nieuwsma, Loretto, MN (US); Brian J. Schlenker, Shoreview, MN (US); Matthew-David S. Frantz, Eden Prairie, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/404,205

(22) Filed: Aug. 17, 2021

(65) Prior Publication Data

US 2023/0055131 A1     Feb. 23, 2023

(51) Int. Cl.
| | |
|---|---|
| *E01C 23/088* | (2006.01) |
| *E01C 23/12* | (2006.01) |
| *E01C 23/06* | (2006.01) |
| *F16H 57/04* | (2010.01) |

(52) U.S. Cl.
CPC .......... *E01C 23/088* (2013.01); *E01C 23/065* (2013.01); *E01C 23/127* (2013.01); *F16H 57/045* (2013.01); *F16H 57/0413* (2013.01); *F16H 57/0415* (2013.01); *F16H 57/0436* (2013.01)

(58) Field of Classification Search
CPC ............. F16H 57/0413; F16H 57/0415; F16H 57/0416; F16H 57/0417; F16H 57/0436; F16H 57/045; E01C 23/065; E01C 23/088; E01C 23/0933; E01C 23/0946; E01C 23/0993; E01C 23/127; F16N 39/02; F16N 39/04; F16N 2200/10; F16N 2270/56; B60R 17/02
See application file for complete search history.

(56) References Cited

U.S. PATENT DOCUMENTS

| | | |
|---|---|---|
| 7,267,086 B2 | 9/2007 | Allen et al. |
| 8,316,806 B2 | 11/2012 | Söderberg et al. |
| 8,392,047 B2 | 3/2013 | Dreier et al. |
| 10,480,391 B2 | 11/2019 | Gonze et al. |
| 10,808,598 B2 | 10/2020 | Toyama et al. |

(Continued)

FOREIGN PATENT DOCUMENTS

| | | | |
|---|---|---|---|
| WO | WO-2018024686 A1 | * | 2/2018 |
| WO | WO 2020/092538 A1 | | 5/2020 |

*Primary Examiner* — Janine M Kreck
*Assistant Examiner* — Michael A Goodwin
(74) *Attorney, Agent, or Firm* — Leydig, Voit & Mayer, Ltd.

(57) ABSTRACT

A propelled milling machine includes a cutting rotor that receives power from an internal combustion engine via a rotor drivetrain. To adjust the speed of the cutting rotor, the rotor drivetrain includes a rotor drivetrain transmission operatively associated with a rotor drivetrain lubrication circuit. To regulate temperature of the lubricant, a heat exchanger circuit is associated with the rotor drivetrain lubrication circuit and includes a rotor drivetrain lubricant heat exchanger and a rotor drivetrain lubricant pump assembly. The quantity of lubricant directed to the heat exchanger is regulated based on one or more sensed operating parameters associated with the lubricant.

19 Claims, 4 Drawing Sheets

(56) References Cited

U.S. PATENT DOCUMENTS

| | | | |
|---|---|---|---|
| 2004/0045749 A1 | 3/2004 | Jaura et al. | |
| 2011/0255919 A1* | 10/2011 | Graner | E01C 23/088 |
| | | | 404/90 |
| 2013/0319778 A1* | 12/2013 | MacGregor | B60K 11/04 |
| | | | 180/68.1 |
| 2015/0337506 A1* | 11/2015 | Reuter | E01C 23/127 |
| | | | 299/39.4 |
| 2016/0053446 A1* | 2/2016 | Killion | E01C 23/127 |
| | | | 299/1.5 |
| 2017/0292649 A1* | 10/2017 | Lubischer | F16H 57/0435 |
| 2018/0135257 A1 | 5/2018 | Schlenker et al. | |
| 2018/0266552 A1* | 9/2018 | Berning | F16H 1/28 |

\* cited by examiner

| Flow State | Lubricant Temperature | | Lubricant Pressure | | Hydraulic Temperature | | Current [mA] |
|---|---|---|---|---|---|---|---|
| | State Increase Threshold | State Decrease Threshold | State Increase Threshold | State Decrease Threshold | State Increase Threshold | State Decrease Threshold | |
| No Flow | XXXX | XXXX | XXXX | XXXX | XXXX | XXXX | |
| Low Flow | XXXX | XXXX | XXXX | XXXX | XXXX | XXXX | XXXX |
| Med. Flow | XXXX | XXXX | XXXX | XXXX | XXXX | XXXX | XXXX |
| Full Flow | XXXX | XXXX | XXXX | XXXX | XXXX | XXXX | XXXX |

FIG. 4

MILLING MACHINE WITH HEAT EXCHANGER CIRCUIT

TECHNICAL FIELD

This patent disclosure relates generally to a machine for milling a work surface such as a rotary mixer equipped with a cutting rotor that can be rotatably driven with respect to the work surface and, more particularly, to a rotor drivetrain lubrication circuit for lubricating the rotor drivetrain.

BACKGROUND

There exist various propelled milling machines for removing or milling material such as pavement, asphalt, or concrete from a work surface such as a roadway or similar surfaces. For example, a rotary mixer is a type of propelled machine that includes a cutting rotor rotatably supported by a machine frame that can traverse a work surface by, for example, a plurality of wheels. As the rotary mixer travels over the work surface, the cutting rotor can be lowered into and penetrate the work surface and thereby fragment and break apart the top layer of the work surface. In the example of a rotary mixer, the fragments and debris are left on the work surface and can be reused as aggregate in a subsequent paving operation. In another example, a cold planer is a similar type of propelled machine with a cutting rotor operatively associated with a conveyor to receive and remove the debris from the work surface, for example, by directing the material to a haul truck leading or following the cold planer.

To both propel the milling machine and rotatably drive the cutting rotor, a prime mover such as an internal combustion engine may be included that generates power in the form of rotational motion that can be transmitted to various driven elements like the propulsion devices and cutting rotor. Because the internal combustion engine may be designed to operate at particular speeds or rpms, or may operate most efficiently at particular speeds or rpms, which are different than the desired speed of the driven elements, it is often necessary to include speed reduction machinery such as transmissions or gear trains operatively associated with the driven elements. In addition, in the case of a cutting rotor, it may be desirable to adjust the torque or rotational force at which the cutting rotor rotates based on the material being milled, for example, asphalt versus soil.

U.S. Publication No. 2018/0135257, assigned to the assignee of the present application, describes a rotary mixer equipped with a rotor transmission including gearboxes of selectively engageable gears for adjusting the speed and/or torque of the cutting rotor. The rotor transmission can receive power output from the internal combustion engine and can selectively engage and disengage gears to adjust the rotational speed directed to the cutting rotor. The present application is directed to a similar rotor drivetrain for a propelled milling machine and particularly to a rotor drivetrain lubrication circuit for such as machine.

SUMMARY

The disclosure describes, in one aspect, a propelled milling machine for milling a work surface like a roadway covered in asphalt or pavement. A propelled milling machine may include a machine frame supported on a plurality of propulsion devices for travel over a work surface and an internal combustion engine supported on the machine frame and powering the propulsion devices to propel the machine over the work surface. To mill the work surface, a cutting rotor is also rotatably supported by the machine frame. To rotate the cutting rotor, a rotor drivetrain is disposed between the internal combustion engine and the cutting rotor. The rotor drivetrain can include a rotor drivetrain transmission having a plurality of gears selectively engageable together to adjust the rotational speed of the cutting rotor. A rotor drivetrain lubrication circuit may be included for supplying liquid lubricant to the plurality of gears of the rotor drivetrain transmission. To manage the temperature of the lubricant, the milling machine can include a heat exchanger circuit operatively associated with the rotor drivetrain lubrication circuit and having a rotor drivetrain lubricant heat exchanger and a rotor drivetrain lubricant pump assembly in fluid communication with each other. To regulate the heat exchanger circuit, the milling machine also includes a heat exchanger control system with an electronic controller in electronic communication with one or more lubricant sensors disposed in the heat exchanger circuit. The electronic controller is programmed to adjust quantity of lubricant directed by the heat exchanger circuit to the rotor drivetrain lubricant heat exchanger.

In another aspect, the disclosure describes a method of operating a rotor drivetrain transmission on a propelled milling machine. In accordance with the method, lubricant is circulated in a rotor drivetrain lubrication circuit operatively associated with rotor drivetrain disposed between the internal combustion engine and the cutting rotor. The method senses one or more operating parameters associated with the lubricant in the rotor drivetrain lubrication circuit and, using the one or more operating parameter, performs a lookup operation on a lookup table to determine a desired flow state for lubricant in a heat exchanger circuit. The desired flow rate is used to regulate flow of lubricant between a rotor drivetrain lubricant pump assembly and a rotor drivetrain lubricant heat exchanger in the heat exchanger circuit.

In yet another aspect of the disclosure, there is described a heat exchanger circuit for lubricating a rotor drivetrain on a propelled milling machine. The heat exchanger circuit includes a rotor drivetrain lubrication circuit associated with the rotor drivetrain disposed between an internal combustion engine and a cutting rotor for milling a work surface. A lubricant reservoir is included for accommodating a lubricant and, to cool the lubricant, a rotor drivetrain lubricant heat exchanger is disposed in fluid communication with the lubricant reservoir. A rotor drivetrain lubricant pump assembly is disposed in fluid communication with the rotor drivetrain lubricant heat exchanger. To selectively direct flow of lubricant directly to the lubricant reservoir, a variable flow control valve is disposed to adjust flow of lubricant between the rotor drivetrain lubricant pump assembly and the rotor drivetrain lubricant heat exchanger.

BRIEF DESCRIPTION OF THE DRAWINGS

FIG. 4 is a schematic representation of a computer implemented lookup chart that may be queried by the rotor drivetrain control system and that relates different operational parameters to flow states for the heat exchanger circuit.

DETAILED DESCRIPTION

Figure 1:
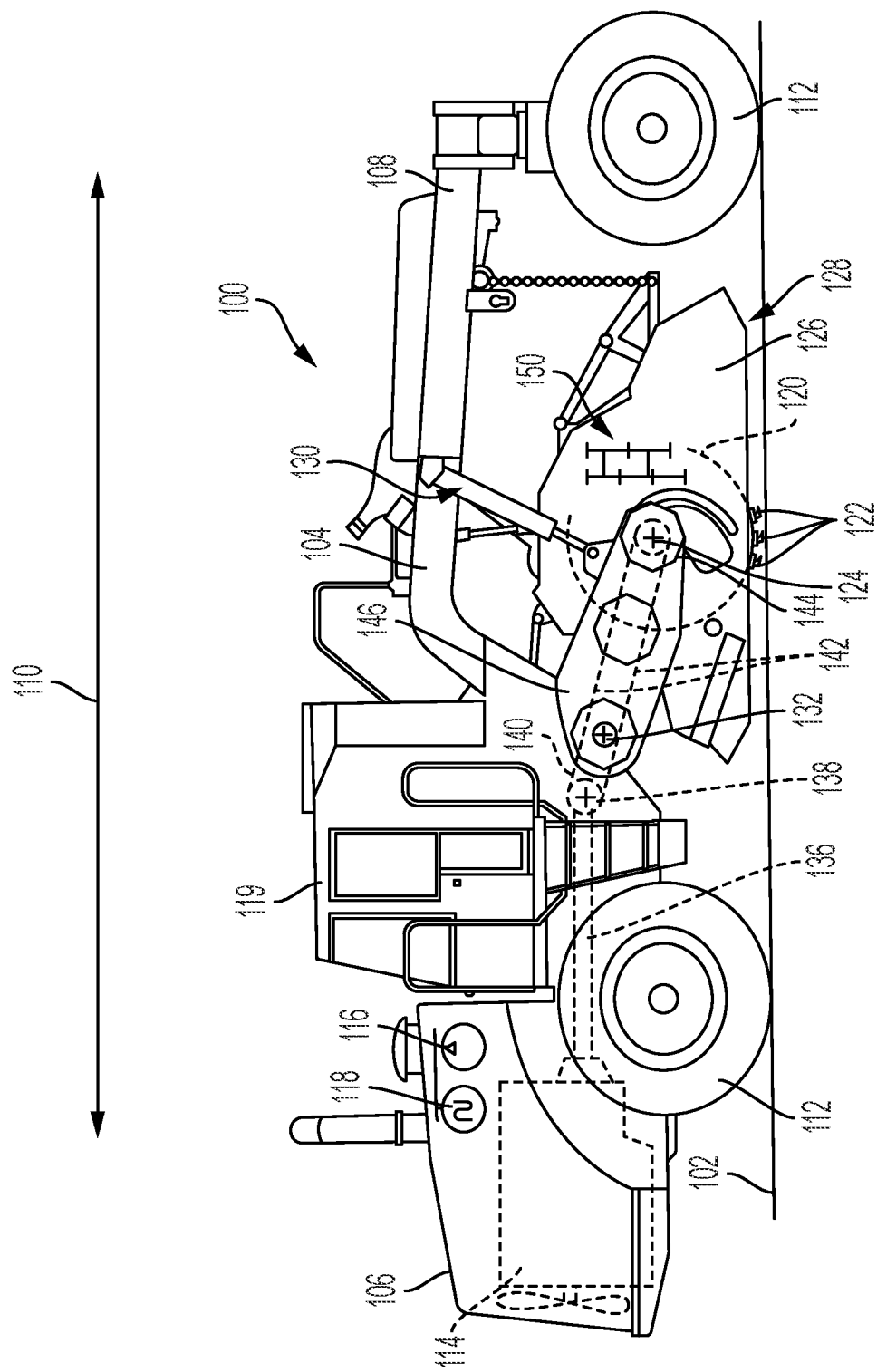
FIG. 1 is a side elevational view of a propelled milling machine, particularly a rotary mixer, including a cutting rotor rotatably driven with respect to the work surface via a rotor drivetrain.

Now referring to the drawings, wherein whenever possible like reference numbers refer to like features, there is illustrated in FIG. 1 a propelled machine in the particular embodiment of a rotary mixer 100 that, as familiar to those of skill in the art, are utilized in road repair and repaving operations. Rotary mixers 100 are configured to remove and reclaim or reuse a layer of a work surface 102 such as pavement, concrete, asphalt, or other material by penetrating into and fracturing the work surface in a milling operation. The fractured material may be redeposited on the work surface 102 where it can be used as a foundation or base aggregate in a subsequent paving operation. In addition to rotary mixers, the present disclosure is applicable to other propelled milling machines such as road planers that can mill, remove, and transfer a layer of the work surface to a haul truck, soil reclaimers for churning and relaying soil, and other machines used in work surface milling operations and similar operations in construction and agriculture.

The rotary mixer 100 can include a machine frame 104 that may be oriented with a forward end 106 and a rearward end 108 that are aligned along a travel direction 110 of the machine; however, because the rotary mixer 100 may operate in both forward and reverse directions, the designations are used herein primarily for reference purposes. The machine frame 104 can be manufactured from heavy gauge steel plates and structural beams. To enable the rotary mixer 100 to travel over the work surface 102, the machine frame 104 can be supported on a plurality of propulsion components 112, and thus the designation of the rotary mixer 100 as a propelled or mobile milling machine. In the illustrated embodiment, the propulsion components 112 can be rotatable wheels that can include rubber pneumatic tires. A pair of wheels may be located at the forward end 106 and a second pair may be located at the rearward end of the rotary mixer 100. The wheels may be designated as powered drive wheels to propel the rotary mixer 100, steerable wheels to adjust direction of the rotary mixer, or combinations thereof. Another suitable embodiment of propulsion components 112 includes continuous tracks such as a closed belt disposed about rollers and/or sprockets where translation of the belt carries the rotary mixer 100 over the work surface 102.

To power the propulsion components 112 and other systems of the rotary mixer 100, a power source such as an internal combustion engine 114 can be disposed on the machine frame 104. The internal combustion engine 114 can burn a hydrocarbon-based fuel like diesel or gasoline and convert the latent chemical energy therein to a mechanical motive force in the form of rotary motion, or torque that can be harnessed for other useful work. The rotary output of the engine 114 can be transmitted through a crankshaft extending from the engine and operatively associated with the propulsion components 112 and other systems. For example, the engine 114 can be operatively coupled to and drive other power systems on the rotary mixer 100 such as a machine hydraulic system including one or more positive displacement hydraulic pumps 116 for pressurizing and directing hydraulic fluid through hydraulic conduits like hoses or tubing. In an embodiment, the propulsion devices 112 may be hydrostatically driven and are operatively associated with hydraulic motors that can be fluidly coupled to the one or more hydraulic pump 116 to receive pressurized hydraulic fluid there from causing rotation of the wheels. Another exemplary system that may be included with the rotary mixer 100 and powered by internal combustion engine 114 can be an electric alternator or electric generator 118 to generate electricity for an electrical system.

To accommodate an operator, the rotary mixer 100 can include an onboard operator cab or operator station 119 on the machine frame 104 at a location that provides visibility over and about the work surface 102 for conducting the milling operation. The operator station 119 can include various controls, readouts, and other input/output interfaces and instrumentation for monitoring and controlling operation of the rotary mixer 100. For example, the operator station 119 can include steering joysticks or steering handles for adjusting the travel direction of the rotary mixer 100, speed controls for adjusting the travel speed of the rotary mixer 100, and controls for adjusting the other systems associated with the rotary mixer 100 like the hydraulic pump 116 and the electric generator 118. In other embodiments, the rotary mixer 100 may be configured for remote operation and some or all of the foregoing operator controls may be located remotely from the onboard operator station 119.

To engage and fragment the work surface 102, the rotary mixer 100 can include a power driven cutting rotor 120 rotatably mounted on and supported by the machine frame 104. The cutting rotor 120 can be a drum-shaped, cylindrical structure having a plurality of picks or teeth-like cutting tools 122 disposed about its cylindrical surface. By way of example only, the cutting rotor 120 may be about 4.5 to 6 feet in diameter. The cylindrical cutting rotor 120 can rotate about a rotor axis 124 that is generally perpendicular to the travel direction 110 and that extends between the first and second lateral sides the machine frame 104. As the cutting rotor 120 rotates, the cutting tools 122 impact and penetrate into the work surface 102 fracturing the material thereof. The cutting tools 122 are adapted to penetrate into the work surface 102 and remove a portion of the material as the rotary mixer 100 advances along the travel axis 110 through a process referred to as milling or planning. In some embodiments, the cutting tools 122 may be removable from the cutting rotor 120 for replacement as they become worn or damaged.

To contain the fragmented material and debris, the cutting rotor 120 can be rotatably accommodated in a box-like housing or rotor enclosure 126 that extends from the machine frame 104 toward the work surface 102. The rotor enclosure 126 can be made from a plurality of metal plates and defines an enclosed space 128 in which the cutting rotor 120 is located. The rotor enclosure 126 can be located approximately mid-length on the machine frame 104 between the forward end 106 and the rearward end 108 so that the machine weight can be disposed on the cutting rotor 120 to assist in penetrating the work surface 102 and so as to maintain a uniform cut depth. In the embodiment of the rotary mixer 100 used in a work surface reclamation process, the enclosed space 128 defined by the rotor enclosure 126 can function as a mixing chamber that can be operatively associated with other systems to receive water or other materials for mixing with the fragmented debris. When the cutting rotor 120 rotates in the rotor enclosure 126, the rotation mixes the fragments and materials that can be redeposited on the work surface 102.

To vertically raise and lower the cutting rotor 120 with respect to the work surface 102, a hydraulic piston 130 can be located on each lateral side of the rotary mixer 100 and can be connected between the machine frame 104 and the rotor enclosure 126. The forward end of the rotor enclosure 126 can also be attached to the machine frame 104 via a pivotal connection 132. The hydraulic pistons 130 can be operatively associated with the hydraulic system on the rotary mixer 100 and can be fluidly coupled to the one or more hydraulic pump 116 via hydraulic lines. Directing pressurized hydraulic fluid to and from the hydraulic pistons 130 causes the pistons to telescopically expand or contract, thereby increasing or decreasing the length of the pistons extending between the machine frame 104 and the rotor enclosure 126. The rotor enclosure 126 thus pivots or tilts about the pivotal connection 132 and hence the cutting rotor 120 is brought into contact and can penetrate into the work surface 102 during the milling operation and the depth of the milling cut can be controlled through selective adjustment of the extension of the hydraulic pistons 130. In addition, the hydraulic pistons 130 can be fully retracted to vertically lift the cutting rotor 120 from the work surface 102 so the rotary mixer 100 can freely travel about the work surface.

Figure 2:
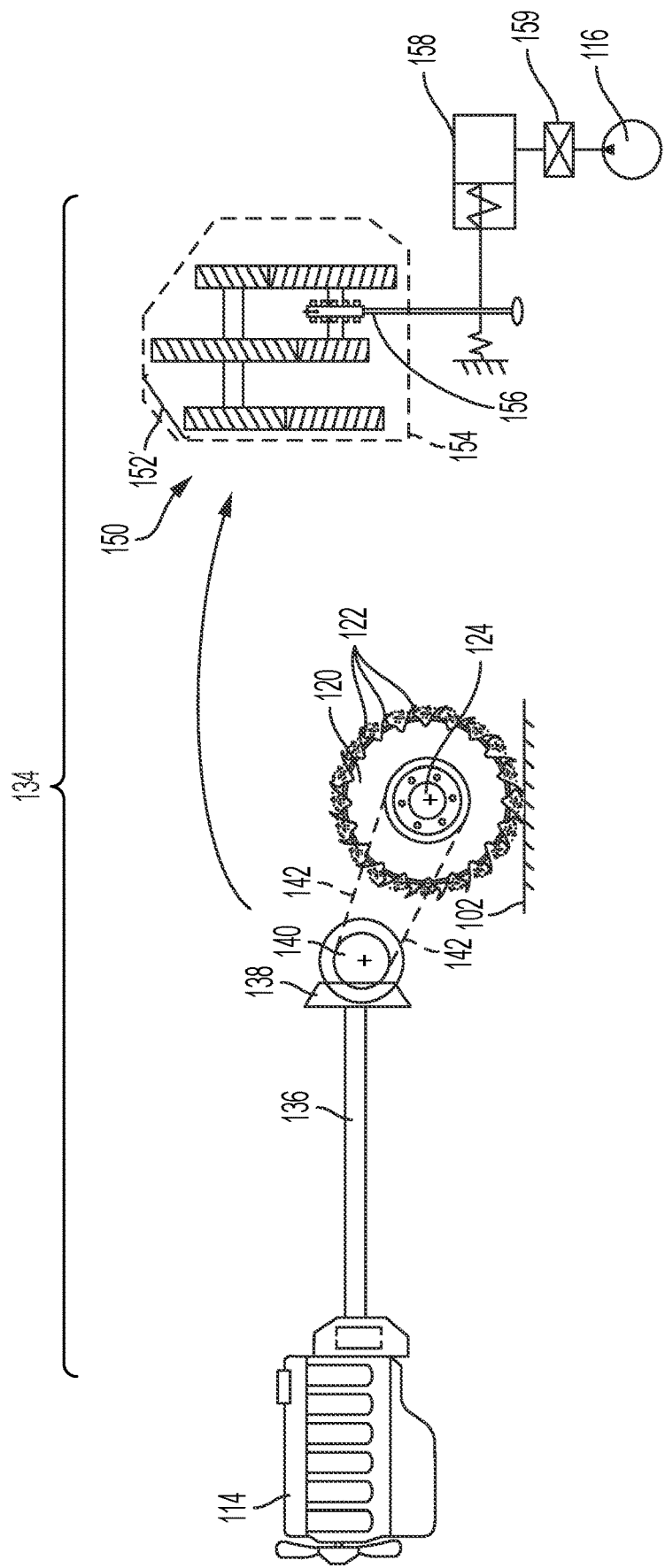
FIG. 2 is a schematic representation of the components of the rotor drivetrain for operatively connecting and transferring power between the internal combustion engine and the cutting rotor of propelled milling machine via a rotor drivetrain transmission.

To cause rotation, the cutting rotor 120 is operatively coupled to the internal combustion engine 114 via an assembly of components referred to as the rotor drivetrain 134. Referring to FIGS. 1 and 2, in a possible embodiment, there is shown schematically a rotor drivetrain 134 that can include a driveshaft 136 joined to the crankshaft of the internal combustion engine 114 though a flywheel-clutch combination at the rear of the engine and which is supported along the machine frame 104 by bearings to extend rearwardly and proximate to the rotor enclosure 126. The driveshaft 136 can be coupled by a differential 138 or similar gear train to an axle 140 arranged perpendicular to the travel direction 110 of the rotary mixer 100. The differential 138 redirects the rotational motion and torque transmitted through the driveshaft 136 to the axle 140 at a right angle perpendicular to the travel direction 110 and parallel with the cutting rotor 120 and rotor axis 124. The axial ends of the axle 140 can be formed as sprockets or pulleys adapted to interact with one or more rotor drive belts 142 that extend to and pass about the rotor hub 144. The drive belts 142 transmit mechanical power from the rotation of the axle 140 to rotor hub 144 causing rotation of the cutting rotor 120 about the rotor axis 124. The drive belts 142 may be enclosed in a belt housing 146 shown in FIG. 1. Other arrangements of different components are possible for the rotor drivetrain 134.

In an embodiment, the rotary mixer 100 may be configured to operate the cutting rotor 120 at different rotational speeds and/or torques that can be selected depending upon the different materials being milled such as, for example, concrete compared to dirt. Additionally, the speed of the cutting rotor 120 may be selectively set for different operations such as pulverizing, blending, and mixing. To enable the selective changing of the speed of the cutting rotor 120, the rotor drivetrain 134 can include or be associated with a rotor drivetrain transmission 150. The rotor drivetrain transmission 150 can include a plurality of selectively engageable gears 152 of different sizes disposed in a gearbox 154 that can vary the rotational speed of the cutting rotor 120 and, in a generally inverse relation, the torque developed by the cutting rotor 120. The gears 152 can have straight cut or diagonally cut teeth that mesh together such that rotation of the first gear rotateably drives the second gear. The diameters and the number and spacing of the teeth of the gears 152 can be different so that a pair of intermeshed gears will rotate at different rotational speeds. The rotor drivetrain transmission 150 can be configured with multiple fixed gear ratios that represent different ratios between input speed and output speed of the transmission.

The gears 152 can be brought into and out of fixed engagement by associated clutches 156. The plurality of gears 152 may be operatively associated with one or more clutches 156. The clutch 156 can be in the form of a collar that slides back and forth between different pairs of plurality of gears 152 and can mate with the different gear pairs to bring them into and out of operative engagement with the cutting rotor 120. To actuate the clutch 156 and move it between the plurality of gears 152, the clutch can be operatively associated with a clutch actuator 158 and one or more hydraulic valves 159 arranged to direct hydraulic fluid to and from the clutch actuator. The clutch actuator 158 and the hydraulic valve 159 are operatively associated with a hydraulic system of the rotary mixer 100 and can receive hydraulic fluid from the hydraulic pump 116 disposed on the rotary mixer.

As indicated schematically by FIGS. 1 and 2, the rotor drivetrain transmission 150 can be positioned at any suitable location in the rotor drivetrain 134. In an embodiment, components of the rotor drivetrain transmission 150 such as, for example, one or more of the gearboxes 154 can be interconnected as components proximate with and connected to the cutting rotor 120. The drive belt 142 can direct motive power to the rotor drivetrain transmission 150 to rotate the intermeshed gears 152 that vary the input rotational speed and torque based on their gear ratios. In another embodiment, the rotor drivetrain transmission 150 can be disposed proximate to and in a close coupled relation to the internal combustion engine 114 and can receive the power output from the crankshaft of the internal combustion engine, adjust the speed and torque ratios through the engageable gears 152, and continues to transmit rotational motion to the driveshaft 136. The rotor drivetrain transmission 150 can be disposed at any other suitable position within the rotor drivetrain 134.

Figure 3:
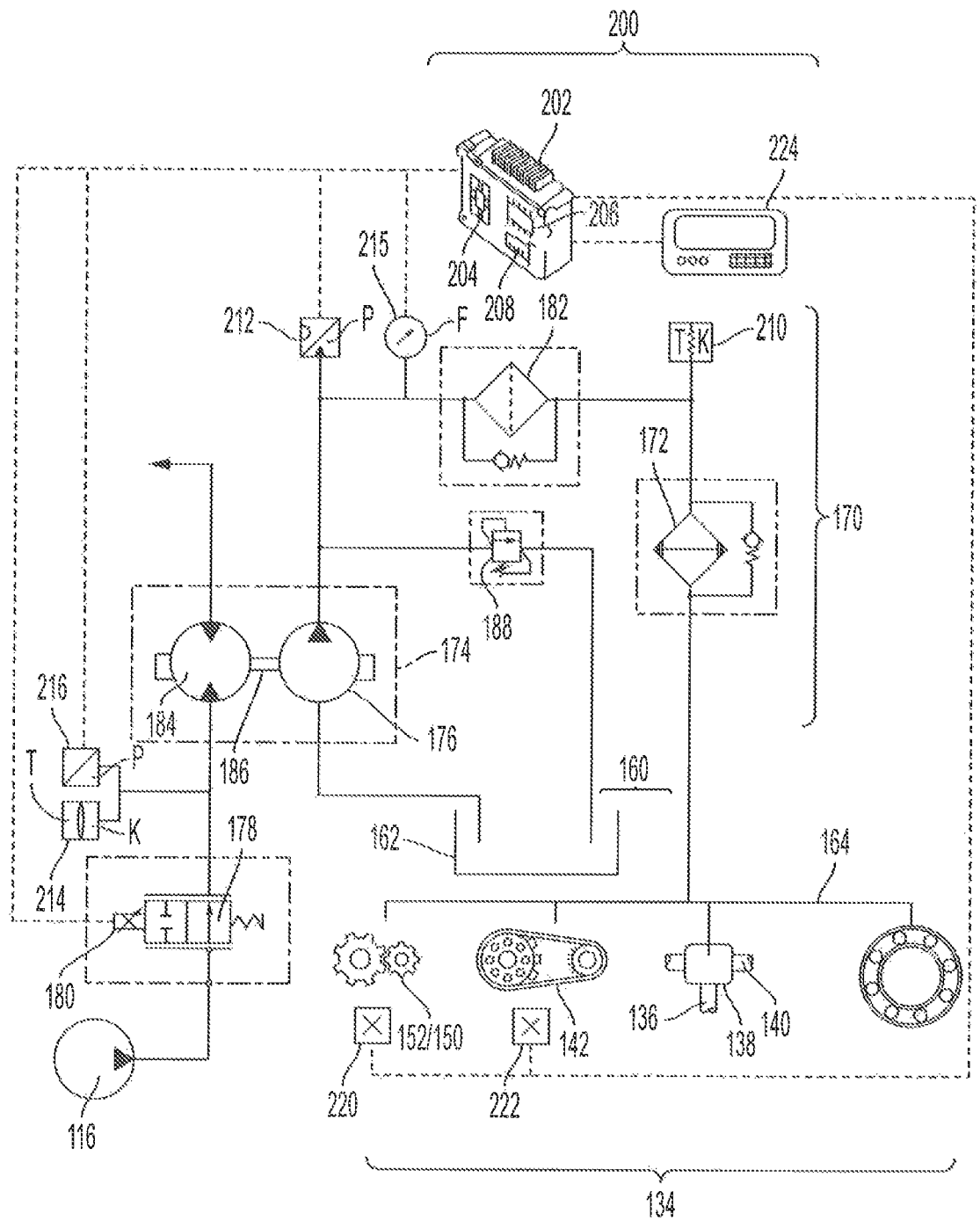
FIG. 3 is a schematic representation of a heat exchanger circuit associated with a rotor drivetrain lubrication circuit for lubricating the rotor drivetrain and rotor drivetrain transmission, the heat exchanger circuit including a rotor drivetrain lubricant pump assembly and a rotor drivetrain lubricant heat exchanger and that is operatively associated with a heat exchanger control system.

Because the rotor drivetrain 134 may include a number of moving and interacting components including the driveshaft 136, differential 138, axle 140 and the engaging gears 152 of the rotor drivetrain transmission 150, the rotary mixer 100 can be equipped with a rotor drivetrain lubrication circuit 160. Referring to FIG. 3, there is schematically illustrated a representation of the rotor drivetrain lubrication circuit 160 for directing oil or a similar liquid lubricant to the various components of the rotor drivetrain 134. To accommodate the lubricant, the rotor drivetrain lubrication circuit 160 may include a fluid lubricant source such as a refillable reservoir 162 or tank which may be vented or pressurized and that is in fluid communication with rotor drivetrain 134 via conduits 164 and the like. The lubricant reservoir 162 may function as a sump to which lubricant flows after circulation to the components of the rotor drivetrain 134

Different drivetrain components lubricated by the rotor drivetrain lubrication circuit 160 can include the engageable gears 152 disposed in the gearbox 154 associated with the rotor drivetrain transmission 150. Other components that may be lubricated by the rotor drivetrain lubrication circuit 160 can include one or more of the differential 138 operatively disposed between the driveshaft 136 and the axle 140, the journal bearings that rotatably connect and support the cutting rotor 120 in the rotor enclosure 126, and, in the embodiments in which drive chains are used, the housings 146 may partially fill with lubricant. In an embodiment, the rotor drivetrain lubrication circuit 160 can lubricate electric motors that may be operatively associated with the rotor drivetrain 134. The foregoing list of drivetrain components are exemplary and there may be fewer or more components lubricated by the rotor drivetrain lubrication circuit.

The lubricant provided by the rotor drivetrain lubrication circuit 160 reduces friction between the moving components of the rotor drivetrain 134 that engage in mutual contact, thus reducing wear on the components and transferring heat generated by friction between the moving components. However, because of the heat transfer, the temperature of the lubricant circulated in the rotor drivetrain lubrication circuit 160 may rise. The operational performance and efficiency is improved when the rotor drivetrain 134 is operating in a specific temperature range to ensure correct viscosity so the lubricant can flow and to perform the heat transfer function and prevent overheating.

Accordingly, the rotor drivetrain lubrication circuit 160 can incorporate or be associated with a heat exchanger circuit 170 including a rotor drivetrain lubricant heat exchanger 172 fluidly coupled with a rotor drivetrain lubricant pump assembly 174 configured to cooperatively operate together to selectively control the lubricant temperature. The rotor drivetrain lubricant heat exchanger 172 can have any suitable construction for a hydraulic heat exchanger and can include a plurality of bundled tubes or pipes through which the lubricant flows. The tubes are generally exposed to an external cooling medium that removes heat from the lubricant via convection through the tube walls. The rotor drivetrain lubricant heat exchanger 172 may be forced air cooled or liquid cooled and preferably the rotor drivetrain lubricant heat exchanger 172 is mounted on the machine frame of the rotary mixer 100 at a location where it can readily dissipate heat to the environment. Although in the present disclosure the rotor drivetrain lubricant heat exchanger 172 typically will cool the lubricant flowing therein, in some applications the heat exchanger may heat the lubricant. The rotor drivetrain lubricant heat exchanger 172 can be in fluid communication with and drains lubricant to the lubricant reservoir 162.

In an embodiment, the rotor drivetrain lubricant pump assembly 174 can be configured to vary the quantity of lubricant flow directed to the rotor drivetrain lubricant heat exchanger 172. In particular, to pressurize and displace the lubricant, the rotor drivetrain lubricant pump assembly 174 may include a pump 176 which can be any suitable type of design including a piston pump, vane pump, gear pump and the like. In a specific embodiment, the pump 176 can be a fixed displacement pump and the quantity of fluid directed to the rotor drivetrain lubricant heat exchanger 172 can be varied by inclusion of a variable flow control valve 178 operatively associated with the pump 176. The variable flow control valve 178 can be included with the rotor drivetrain lubricant pump assembly 174 or can be a distinct device. The variable flow control valve 178 is adjustable to alter the quantity of fluid lubricant that is displaced by the rotor drivetrain lubricant pump assembly 174 and directed to the rotor drivetrain lubricant heat exchanger 172. The variable flow control valve 178 may be operatively associated with a valve control 180 such as, for example, an electromagnetic solenoid that enables adjustment by opening or closing the variable flow control valve. The variable flow control valve 178 can be proportional and adjustable so as to produce a range of flow rates and pressures and thus regulates the quantity of lubricant directed to the rotor drivetrain lubricant heat exchanger.

The heat exchanger circuit 170 can include other components that are operable upon the fluid lubricant flowing therein. For example, to remove contaminants from the fluid lubricant, the heat exchanger circuit 170 can include filter 182 or strainer through which the lubricant may be directed from the pump 176. In the illustrated embodiment, the filter 182 is fluidly disposed between the rotor drivetrain lubricant pump assembly 174 and the rotor drivetrain lubricant heat exchanger 172 such that substantially all lubricant directed to the rotor drivetrain lubricant heat exchanger passes across the filter 182. In another embodiment, the heat exchanger circuit 170 can include a relief valve 188 that is disposed in a fluid line of the circuit that is parallel to the filter 182 and arranged such that the filter and the relief valve communicate with opposite sides of the rotor drivetrain lubricant heat exchanger 172. The relief valve can be actuated to bypass the rotor drivetrain lubricant heat exchanger 172 and direct lubricant from the rotor drivetrain lubricant pump assembly 174 to the lubricant reservoir 162.

In an embodiment, to drive the pump 176, the rotor drivetrain lubricant pump assembly 174 can be operatively associated with the hydraulic system included on the rotary mixer. For example, the hydraulic system can include a hydraulic motor 184 that receives pressurized hydraulic fluid from the hydraulic pump 116. The hydraulic motor 184 is a mechanical actuator that converts hydraulic pressure to rotation and torque. The hydraulic motor 184 can have any suitable construction such as a rotary vane motor, piston motor, gear motor and the like. The hydraulic motor 184 can be mechanically coupled with the pump 176 by a shaft 186 so that rotation of the motor rotates the operable internal components of the pump. To selectively activate the hydraulic motor 184 and thus drive the pump 176, the variable flow control valve 178, which may be solenoid actuated, can be disposed upstream of the hydraulic motor 184 to selectively establish fluid communication with the hydraulic pump 116 of the hydraulic system. By activating or deactivating the hydraulic motor 184, the variable flow control valve 178 can thus turn the heat exchanger circuit 170 on and off and further can control the quantity of lubricant displaced by the rotor drivetrain lubricant pump assembly 174 and delivered to the rotor drivetrain lubricant heat exchanger 172. In another possible embodiment, the rotor drivetrain lubricant pump assembly can be electrically driven by an electric motor whose rotational speed can be varied.

To regulate the quantity of lubricant flowing in the heat exchanger circuit 170, the heat exchanger circuit can be operatively associated with a heat exchanger control system 200 that can be implement in the form of computer executable programming and associated computer and electronic hardware. For example, the heat exchanger control system 200 can be associated with and implemented through an electronic controller 202, sometimes referred to as an electronic control module (ECM) or electronic control unit (ECU). The electronic controller 202 can include various circuitry components for receiving and processing data and software to maintain an advantageous temperature of the lubricant. In addition to the heat exchanger control system 200, the electronic controller 202 can be responsible for processing functions associated with various other systems on the rotary mixer, including the rotor drivetrain lubrication circuit 160 and the hydraulic system. While the electronic controller 202 is illustrated as a standalone device, its functions may be distributed among a plurality of distinct and separate components.

For example, the electronic controller 202 can include a one or more microprocessors 204 such as a central processing unit (CPU), an application specific integrated circuit (ASIC), or a field programmable gate array (FPGA) comprising a plurality of transistors and similar circuits that are capable of reading, manipulating and outputting data in electronic form. The electronic controller 202 can include non-transient programmable memory 206 or other data storage capabilities that may be in random access memory or more permanent non-volatile forms of data storage media. Common examples of computer-readable memory 206 include RAM, PROM, and EPROM, a FLASH-EPROM, and any other memory chip or cartridge. The memory is capable of storing in software form the programming instructions and the data that can be read and processed by the microprocessor 204. The software and data may take the form of instruction sets, programs, applications, routines, libraries, databases, lookup tables, data sets, and the like. To communicate with other instruments and actuators associated with the heat exchanger control system 200, the electronic controller 202 can include various input/output ports 208 and related circuitry. Communication may be established by sending and receiving non-transitory digital or analog signals across electronic communication lines or communication busses using any suitable data communication protocols. The various communication and command channels are indicated in dashed lines for illustration purposes.

For example, to receive data regarding the physical characteristics of the lubricant and the operating parameters and status of the heat exchanger circuit 170, the heat exchanger control system 200 can include one or more sensors operatively associated with the heat exchanger circuit 170. A sensor as used herein refers to any device capable of detecting information regarding its surrounding environment and detecting changes to the state of the environment. The sensor may include a plurality of lubricant sensors that measure characteristics and properties of the rotor drivetrain lubrication circuit 160 and the associated heat exchanger circuit 170.

For example, a lubricant temperature sensor 210 may be disposed in the fluid conduits of the heat exchanger circuit 170 where it can be exposed, directly or indirectly, to the lubricant flowing therein. The lubricant temperature sensor 210 can therefore determine the operating temperature of the lubricant and send that information in the form of non-transitory electronic signals to the electronic controller 202. The lubricant temperature sensor 210 can operate on any suitable temperature registration technique including, for example, infrared readings, expansion and contraction of thermometric materials, electrical resistivity, and the like. The lubricant temperature sensor 210 can be located in proximity to the rotor drivetrain lubricant heat exchanger 172 to sense the temperature of the lubricant entering or exiting the heat exchanger.

To measure the pressure of the lubricant flowing in the heat exchanger circuit 170, the heat exchanger control system 200 can also include a lubricant pressure sensor 212 disposed in a flow conduit of the heat exchanger circuit. The lubricant pressure sensor 212 may function as a transducer measuring the force being applied by the flowing lubricant and can output that information in the form of non-transitory electronic signals to the electronic controller 202. The lubricant pressure sensor 212 can operate on any suitable pressure sensing technology including piezoelectric sensing, capacitive sensing, electromagnetic systems, optical sensing or otherwise. The lubricant pressure sensor 212 may sense pressure readings in terms of either static or dynamic pressures. The lubricant pressure sensor 212 can be disposed at any suitable location in the heat exchanger circuit 170 although it may desirably be in proximity to the rotor drivetrain lubricant pump assembly 174.

In an embodiment, to measure the flow rate or quantity of lubricant flowing in the heat exchanger circuit 170, the heat exchanger control system 200 can also include a flowrate sensor 215 disposed in a flow conduit of the heat exchanger circuit. The flowrate sensor 215 can operate on mechanical, hydromechanical, or electrical principles and can be disposed at any suitable location in the heat exchanger circuit 170 to measure flowrate or lubricant quantity to the rotor drivetrain lubricant heat exchanger 172.

The heat exchanger control system 200 can include other sensors and controls associated with other systems on the rotary mixer that may affect or be reflective of the lubricant temperature. For example, the heat exchanger control system 200 can include a plurality of hydraulic sensors for determining characteristics and properties of the hydraulic system including, for example, a hydraulic temperature sensor 214 and/or a hydraulic pressure sensor 216 operatively associated with the hydraulic system. The hydraulic temperature sensor 214 and the hydraulic pressure sensor 216 may be of the same design and operational technology as the lubricant temperature sensor 210 and the lubricant pressure sensor 212. The hydraulic temperature sensor 214 and the hydraulic pressure sensor 216 can be located either upstream or downstream of the hydraulic motor 184 although desirably they may be located at a position to register properties or characteristic of the hydraulic fluid upstream of the motor.

The heat exchanger control system 200 can also include one or more rotor state sensors for determining an operating state of the cutting rotor. For example, where the rotor drivetrain transmission 150 is configured to operate the cutting rotor 120 at different speeds using different gear ratios, the rotor state sensors can include a rotor drivetrain transmission sensor 220 to determine which particular gear ratio the rotor drivetrain transmission 150 is presently engaged in. The rotor drivetrain transmission sensor 220 may be a positional or a hydromechanical sensor that registers the positions of different gears disposed in the rotor drivetrain transmission or the fluid flows and pressures directed to the clutches to bring various gear ratios into or out of engagement. The rotor state sensors may include a rotor rotation sensor 222 that determines whether the cutting rotor 120 is rotating and at what rotational speed. In an embodiment, the rotor rotation sensor 222 can be an angular sensor operatively associated with the drive chains 142 and/or the sprockets around which the chains pass. Other rotor state sensors can determine the torque or force applied to the cutting rotor 120 from penetration and milling operations, travel speed of the rotary mixer 100, and other sensors. Moreover, the list of sensors is non-exhaustive and is not limited to the foregoing.

To interact with a human operator of the rotary mixer, the heat exchanger control system 200 can be operatively associated with a visual display or human machine interface (HMI) 224. The HMI 224 can be located either onboard the rotary mixer for example, in the operator station or may be located off board in embodiments where the rotary mixer is configured for remote operation. The HMI 224 can be configured to provide visual or numeric representations regarding the operating characteristics of the heat exchanger circuit 170 and the properties of the lubricant flowing therein. The HMI 224 can include input functionalities such as keypads, dials, knobs and the like to receive commands and inputs from the operator for regulating and adjusting the heat exchanger control system 200.

INDUSTRIAL APPLICABILITY

The disclosure is applicable to regulating and controlling the temperature of liquid lubricant used to lubricate the rotor drivetrain 134 and/or other components associated with a cutting rotor 120 dispose on a rotary mixer 100 or a similar propelled milling machine 100. Referring to FIG. 4, and with reference to the prior figures, there is illustrated a relational chart that can be implemented as a non-transitory, computer-processable lookup table 230 that relates various parameters, conditions, states, and values to regulate operation of the heat exchanger control system 200. The lookup table 230 may be implemented or visualized as a table of rows and columns for cross-referencing purposes. In particular, the lookup table 230 may include a flow state column 232 that determines the quantity of lubricant flow that should be directed to the rotor drivetrain lubricant heat exchanger 172. Examples of flow states in the flow state column 232 include a no flow or zero flow state, a low flow state, a medium flow states, and a full flow states. In another embodiment, the flow state may be a non-discrete, variable or proportional flow state. Actual values for the various flow states in the flow state column 232 are dependent upon the total quantity of lubricant in the rotor drivetrain lubrication circuit 160 and can be quantified, for example, in liters or gallons per minute. In addition, the list of flow states in the flow state column is non-exhaustive and non-limiting, and may include more or fewer flow states than listed.

The lookup table 230 can be configured to increase or decrease the quantity of lubricant directed to the rotor drivetrain lubricant heat exchanger 172 by adjusting between and selecting different flow states in the flow state column 232. For example, the lookup table 230 can include a lubricant temperature column 234 that can include temperature trigger values to change flow states based on the registered temperature of the lubricant. Moreover, the lubricant temperature column 234 can include an increase threshold sub-column 236 and a decrease threshold sub-column 238 with set temperature values commanding when the heat exchanger control system 200 should increase or decrease flow rate to the rotor drivetrain lubricant heat exchanger 172. The heat exchanger control system 200 determines the lubricant temperature using the lubricant temperature sensor 210 disposed in the heat exchanger circuit 170 and communicating electronic data with the electronic controller 202. By examining and looking up the sensed value of the lubricant temperature in the lookup table 230, the heat exchanger control system 200 determines whether to increase, decrease or maintain the flow quantity of lubricant to the rotor drivetrain lubricant heat exchanger 172. The flow state in the flow state column 232 corresponding to the sensed lubricant parameter becomes the desired flow state for directing lubricant to the rotor drivetrain lubricant heat exchanger.

The heat exchanger control system 200 can utilize other parameters to determine whether to increase or decrease the quantity of lubricant directed to the rotor drivetrain lubricant heat exchanger 172. For example, the lookup table 230 can include a lubricant pressure column 240 that includes pressure trigger values for changing flow states in the flow state column based on the registered pressure of the lubricant. The lubricant pressure column 240 can also include an increase threshold sub-column 242 and a decrease threshold sub-column 244 with pressure values for commanding when the heat exchanger control system 200 should increase or decrease the flow rate to the rotor drivetrain lubricant heat exchanger 172. The heat exchanger control system 200 looks up the registered lubricant pressure, as measured by the lubricant pressure sensor 212 associated with the heat exchanger circuit 170 and communicating electronic data with the electronic controller 202, in the lookup table 230 and determines whether to increase, decrease or maintain the flow quantity of lubricant to the rotor drivetrain lubricant heat exchanger 172.

The heat exchanger control system 200 can utilize parameters from other systems on the rotary mixer to increase or decrease the quantity of lubricant directed to the rotor drivetrain lubricant heat exchanger 172. For example, the lookup table 230 may include a hydraulic temperature column 246 that includes trigger values based on the hydraulic temperature of the hydraulic fluid in the system. The hydraulic temperature column 246 may also include an increase threshold sub-column 248 and a decrease threshold sub-column 250 respectively. Utilizing the sensed or registered values for the hydraulic temperature as determined by the hydraulic temperature sensor 214 associated with the hydraulic system and comparing those values with the lookup table 230, the heat exchanger control system 200 determines whether to increase, decrease or maintain the flow quantity of lubricant to the rotor drivetrain lubricant heat exchanger 172 by adjusting between flow states in the flow state column 232.

The heat exchanger control system 200 can also utilize information from the rotor state sensors to regulate the quantity of lubricant directed to the rotor drivetrain lubricant heat exchanger 172. For example, if the rotor rotation sensor 222 determines that the cutting rotor 120 is disengaged with respect to the work surface and is not rotating, the heat exchanger control system 200 can default to the low flow state in the flow state column 232 of the lookup table 230 since rotor drivetrain 134 may be utilizing a minimal quantity of lubricant. If the heat exchanger control system 200 determines the torque applied to the cutting rotor exceeds a threshold value, it may default to the full flow state in the flow state column 232 of the lookup table 230 to maximize cooling of the lubricant.

Referring particularly to FIGS. 3 and 4, actualization of the adjustment of the flow quantity of lubricant to the rotor drivetrain lubricant heat exchanger 172 can be accomplished by the rotor drivetrain lubricant pump assembly 174 and/or the variable flow control valve 178. For example, the lookup table 230 can include a current command column 258 that has a plurality of electric current values in, for example, milliamps. The heat exchanger control system 200 can look up the selected flow state in the flow state column 232 and the corresponding electrical current value in the current command column 258. The heat exchanger control system 200 using the electronic controller 202 applies that electric current to the variable flow control valve 178. The applied current adjusts operation of an electromagnetic control solenoid 180 that may be operatively associated with the variable flow control valve 178 thereby selectively adjusting the quantity of lubricant flowing in the heat exchanger circuit 170 to the rotor drivetrain lubricant heat exchanger 172. In the embodiment where the rotor drivetrain lubricant pump assembly 174 is electrically operated, the current command column 258 in the lookup table 230 may correspond to power directed to the electric motor associated with the rotor drivetrain lubricant pump assembly 174 by the heat exchanger control system 200 to vary the speed of the rotor drivetrain lubricant pump assembly 174.

The additional parameters that may be considered in accordance with the disclosure is not limited to the foregoing examples but may include additional parameters and conditions monitored by the heat exchanger control system 200. Examples include operating commands, operational states, etc. One possible advantage to monitoring additional parameters in addition to the lubricant temperature and lubricant pressure is to improve or more accurately and/or quickly identify the appropriate flow states, or refining flow state selection, based on multiple inputs.

The current valves written in the lookup table 230 can correspond to the different flow states listed in the flow state column, and therefore the heat exchanger control system 200 can apply a range of flow state conditions. The variable flow control valve 178 is operated using the different current values and can control and adjust the flow rate from the rotor drivetrain lubricant pump assembly 174 to the rotor drivetrain lubricant heat exchanger across a range of flows and pressures. This is beneficial where the rotor drivetrain transmission 150 may operate at several different speeds and gear ratios because the heat exchanger control system can selectively regulate the quantity of lubricant cooled in the heat exchanger circuit in accordance with the operating conditions of the milling machine.

The heat exchanger control system 200 can also make desirable adjustments to the hydraulic system associated with the rotary mixer to ensure that the heat exchanger circuit 170 is operating efficiently. For example, the temperature of the hydraulic fluid can be measured using the hydraulic temperature sensor 214 that can be in data communication with electronic controller 202. Appropriate control signals can be directed to the rotor drivetrain lubricant pump assembly 174 and variable flow control valve 178 to adjust the flow quantity of lubricant to the rotor drivetrain lubricant heat exchanger. In addition, the electronic controller 202 could direct the variable flow control valve 178 to close thereby isolating the hydraulic motor 184 from hydraulic fluid flow that would shut down the heat exchanger circuit 170. If the rotor states sensors, for example, the rotor drivetrain transmission sensor 220 and/or the rotor rotation sensor 222 determine the cutting rotor 120 is not engaged with work surface 102 or not rotating, the heat exchanger control system 200 can shut down the heat exchanger circuit 170.

The heat exchanger control system 200 advantageously regulates lubricant temperature within desirable ranges for operation of the cutting rotor 120 and rotor drivetrain 134 while avoiding over utilization of the rotor drivetrain lubricant heat exchanger 172 during conditions which adjustment of lubricant temperature is unnecessary. The heat exchanger control system 200 thus has attendant power saving benefits and may prolong useful service life of the rotor drivetrain lubricant heat exchanger 172. The heat exchanger control system 200 may also include other features to assist in operation of the rotary mixer 100. For example, in the event the lubricant temperature or lubricant pressure is excessive or indeterminate, the heat exchanger control system 200 may generate a warning alarm that is communicated to the operator via the HMI 224 associated with the heat exchanger control system. These and other features and advantages of the disclosure should be apparent from the foregoing description and accompanying figures.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A propelled milling machine comprising:
    a machine frame supported on a plurality of propulsion components for travel over a work surface,
    an internal combustion engine supported on the machine frame and operatively associated with the plurality of propulsion components for propelling the propelled milling machine;
    a cutting rotor rotatably supported by the machine frame for milling the work surface;
    a rotor drivetrain disposed between the internal combustion engine and the cutting rotor, the rotor drivetrain driven by the internal combustion engine and transmitting power to the cutting rotor, the rotor drivetrain including a rotor drivetrain transmission having a plurality of gears selectively engageable together to adjust rotational speed of the cutting rotor;
    a rotor drivetrain lubrication circuit for supplying liquid lubricant to the plurality of gears of the rotor drivetrain transmission;
    a heat exchanger circuit operatively associated with the rotor drivetrain lubrication circuit, the heat exchanger circuit including a rotor drivetrain lubricant heat exchanger and a rotor drivetrain lubricant pump assembly in fluid communication with each other; and
    a heat exchanger control system including an electronic controller in electronic communication with one or more lubricant sensors disposed in the heat exchanger circuit, the electronic controller including a lookup table that relates operating parameters registered by the one or more lubricant sensors and that is programmed to increase, decrease or maintain a flow quantity of lubricant directed by the heat exchanger circuit to the rotor drivetrain lubricant heat exchanger.

2. The propelled milling machine of claim 1, wherein the one or more lubricant sensors includes at least one of a lubricant temperature sensor and a lubricant pressure sensor.

3. The propelled milling machine of claim 2, wherein the heat exchanger circuit includes a variable flow control valve for adjusting the flow quantity of lubricant directed from the rotor drivetrain lubricant pump assembly to the rotor drivetrain lubricant heat exchanger.

4. The propelled milling machine of claim 3, a relief valve disposed to bypass the rotor drivetrain lubricant heat exchanger by directing lubricant between the rotor drivetrain lubricant pump assembly and a lubricant reservoir.

5. The propelled milling machine of claim 4, wherein the heat exchanger circuit includes a filter disposed fluidly between the rotor drivetrain lubricant pump assembly and the rotor drivetrain lubricant heat exchanger.

6. The propelled milling machine of claim 3, further comprising a hydraulic system and the rotor drivetrain lubricant pump assembly is operatively driven by the hydraulic system.

7. The propelled milling machine of claim 6, wherein the hydraulic system includes a hydraulic motor operatively coupled to the rotor drivetrain lubricant pump assembly.

8. The propelled milling machine of claim 7, wherein the variable flow control valve is operatively associated with the hydraulic motor to adjust flow from the rotor drivetrain lubricant pump assembly.

9. The propelled milling machine of claim 8, wherein the heat exchanger control system includes a hydraulic temperature sensor disposed in the hydraulic system.

10. The propelled milling machine of claim 1, wherein the lookup table includes one or more of a no flow state, a low flow state, a medium flow state, a high flow state, and a variable flow state.

11. The propelled milling machine of claim 1, wherein the rotor drivetrain lubricant pump assembly is a fixed displacement pump.

12. The propelled milling machine of claim 1, wherein the heat exchanger control system includes one or more rotor state sensors operatively associated with the cutting rotor to determine an operating state.

13. A method of operating a rotor drivetrain on a propelled milling machine, the method comprising:
circulating a lubricant in a rotor drivetrain lubrication circuit operatively associated with the rotor drivetrain, the rotor drivetrain disposed between an internal combustion engine and a cutting rotor;
sensing one or more operating parameters associated with the lubricant in the rotor drivetrain lubrication circuit;
performing a lookup operation on a lookup table utilizing the one or more operating parameters to increase, decrease or maintain a flow quantity of the lubricant in a heat exchanger circuit; and
regulating flow of the lubricant between a rotor drivetrain lubricant pump assembly and a rotor drivetrain lubricant heat exchanger in accordance with said performing the lookup operation.

14. The method of claim 13, wherein the one or more operating parameters includes at least one of lubricant temperature and lubricant pressure.

15. The method of claim 14, wherein a variable flow control valve is operatively associated with the rotor drivetrain lubricant pump assembly to regulate flow between the rotor drivetrain lubricant pump assembly and the rotor drivetrain lubricant heat exchanger.

16. The method of claim 14, further wherein the rotor drivetrain lubricant pump assembly draws lubricant from a lubricant reservoir.

17. The method of claim 13, further comprising powering the rotor drivetrain lubricant pump assembly with a hydraulic motor operatively associated with a separate hydraulic system and a variable flow control valve.

18. A heat exchanger circuit for lubricating a rotor drivetrain on a propelled milling machine, the heat exchanger circuit comprising:
a rotor drivetrain lubrication circuit associated with the rotor drivetrain, the rotor drivetrain disposed between an internal combustion engine and a cutting rotor for milling a work surface;
a lubricant reservoir for accommodating a lubricant;
a rotor drivetrain lubricant heat exchanger in fluid communication with the lubricant reservoir and configured for thermal management of the lubricant;
a rotor drivetrain lubricant pump assembly in fluid communication with the rotor drivetrain lubricant heat exchanger for pressurizing and directing the lubricant in the heat exchanger circuit;
a variable flow control valve disposed in operative association with the rotor drivetrain lubrication circuit to adjust flow of the lubricant from the rotor drivetrain lubricant pump assembly to the rotor drivetrain lubricant heat exchanger,
a heat exchanger control system including an electronic controller in electronic communication with one or more lubricant sensors disposed in the heat exchanger circuit, the electronic controller including a lookup table that relates operating parameters registered by the one or more lubricant sensors and that is programmed to increase, decrease or maintain a flow quantity of lubricant directed by the heat exchanger circuit to the rotor drivetrain lubricant heat exchanger.

19. The heat exchanger circuit of claim 18 further comprising a hydraulic motor operatively associated with a separate hydraulic system and operatively coupled to the rotor drivetrain lubricant pump assembly and the variable flow control valve.

* * * * *